United States Patent

[11] 3,602,705

[72] Inventors James R. Cricchi;
Gustav Cavar, both of Baltimore, Md.
[21] Appl. No. 22,521
[22] Filed Mar. 25, 1970
[45] Patented Aug. 31, 1971
[73] Assignee Westinghouse Electric Corporation
Pittsburgh, Pa.

[54] BINARY FULL ADDER CIRCUIT
19 Claims, 10 Drawing Figs.

[52] U.S. Cl. .......... 235/175, 307/205, 235/173
[51] Int. Cl. .......... G06f 7/385, G06f 7/50, G06f 7/48
[50] Field of Search .......... 235/175, 173, 168; 307/205, 216

[56] References Cited
UNITED STATES PATENTS
3,427,445 2/1969 Dailey .......... 235/175

OTHER REFERENCES
L. L. Boysel, "Adder on a Chip: LSI Helps Reduce Cost of Small Machine," Electronics, March 1968, pp. 119, 120, 122–124. (235/175)

*Primary Examiner*—Malcolm A. Morrison
*Assistant Examiner*—James F. Gottman
*Attorneys*—F. H. Henson, E. P. Klipfel and D. Schron

ABSTRACT: A combinatorial circuit utilizing transmission switch logic wherein the entire arithmetic function including the generation of a sum and output carry signal occurs simultaneously in a two-level logic configuration of interconnected switches which are preferably metal oxide semiconductor field effect transistors. The two-level logic configuration permits shorter propagation time thereby, enabling a high speed of operation. Additionally, the propagation of the output carry signal is increased by controlling the gating of the carry signal independently of the carry input. MOSFETS are preferably utilized because little or no quiescent current flow occurs therein realizing minimum power dissipation.

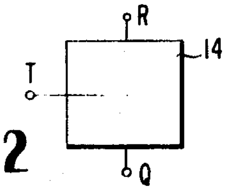
FIG. 2
| T | R | Q |
|---|---|---|
| 0 | X | X |
| 1 | Q | R |
FIG. 3
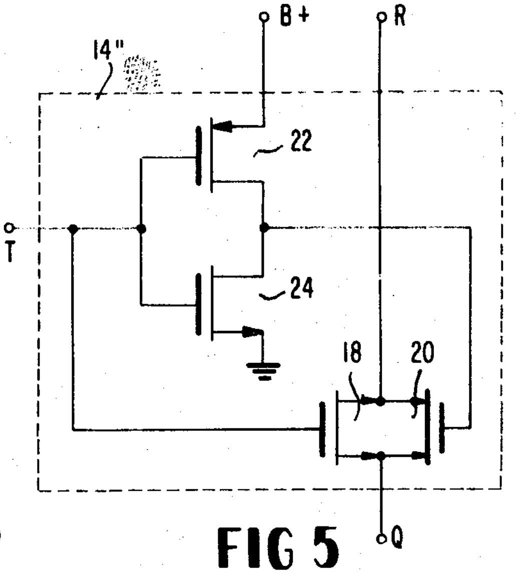
FIG. 5
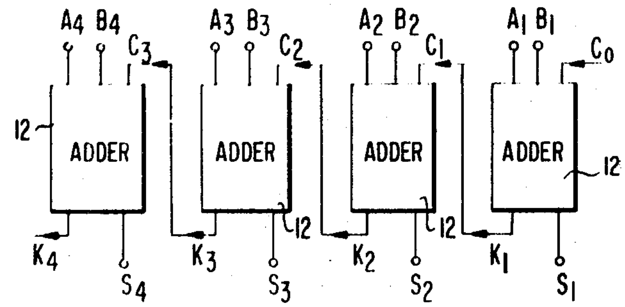
FIG. 1
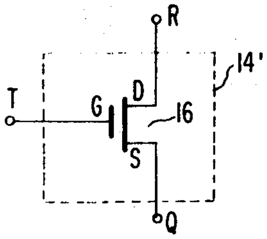
FIG. 4
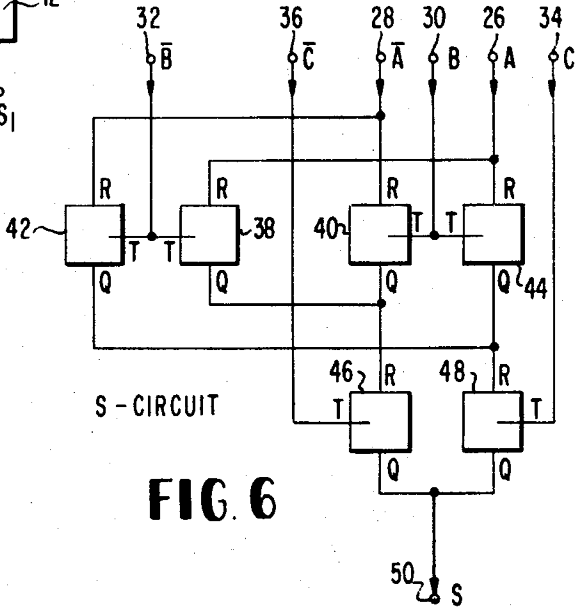
FIG. 6
$S = \bar{C}(A\bar{B} + \bar{A}B) + C(AB + \bar{A}\bar{B})$
| | INPUT TERMINALS | | | | | | | |
|---|---|---|---|---|---|---|---|---|
| | A | Ā | B | B̄ | C | C̄ | S | |
| | 26 | 28 | 30 | 32 | 34 | 36 | 50 | |
| $\overline{A*B}$ | 0 | 1 | 0 | 1 | 0 | 1 | 0 | $S = C(AB + \bar{A}\bar{B})$ |
| | 0 | 1 | 0 | 1 | 1 | 0 | 1 | |
| | 1 | 0 | 1 | 0 | 0 | 1 | 0 | |
| | 1 | 0 | 1 | 0 | 1 | 0 | 1 | |
| $A*B$ | 0 | 1 | 1 | 0 | 0 | 1 | 1 | $S = \bar{C}(A\bar{B} + \bar{A}B)$ |
| | 0 | 1 | 1 | 0 | 1 | 0 | 0 | |
| | 1 | 0 | 0 | 1 | 0 | 1 | 1 | |
| | 1 | 0 | 0 | 1 | 1 | 0 | 0 | |
FIG. 7
$A*B = (A\bar{B} + \bar{A}B)$

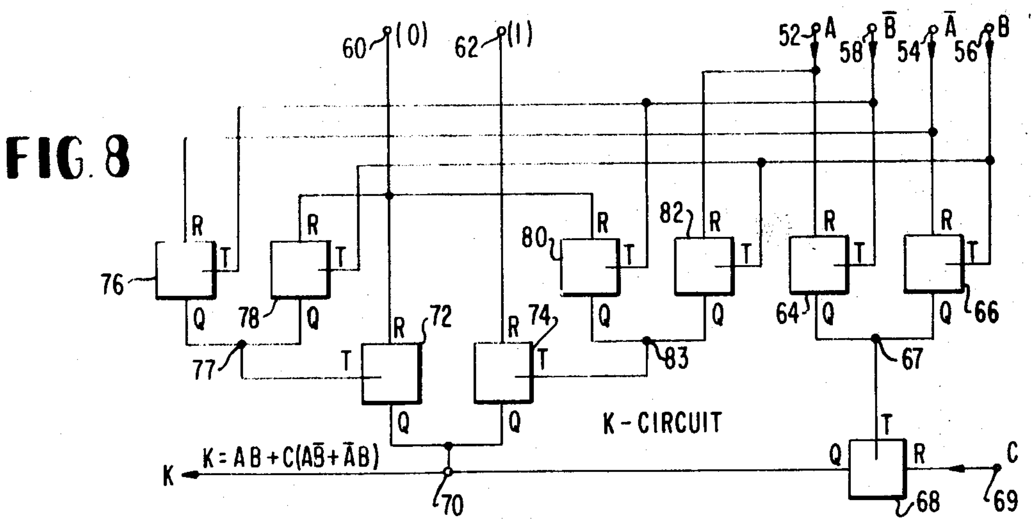
FIG. 8
| | INPUT TERMINALS | | | | | TRANSMISSION SWITCHES | | | | | | | | | JUNCTIONS | | | K | |
|---|---|---|---|---|---|---|---|---|---|---|---|---|---|---|---|---|---|---|---|
| | A | Ā | B | B̄ | C | | | | | | | | | | | | | | |
| | 52 | 54 | 56 | 58 | 69 | 76 | 78 | 72 | 74 | 80 | 82 | 64 | 66 | 68 | 77 | 83 | 67 | 70 | |
| ĀB̄ | 0 | 1 | 0 | 1 | 0 | L | P | L | P | L | P | L | P | P | 1 | 0 | 0 | 0 | K=0 |
| | 0 | 1 | 0 | 1 | 1 | L | P | L | P | L | P | L | P | P | 1 | 0 | 0 | 0 | |
| AB | 1 | 0 | 1 | 0 | 0 | P | L | P | L | P | L | P | L | P | 0 | 1 | 0 | 1 | K=1 |
| | 1 | 0 | 1 | 0 | 1 | P | L | P | L | P | L | P | L | P | 0 | 1 | 0 | 1 | |
| A*B | 0 | 1 | 1 | 0 | 0 | P | L | P | P | P | L | P | L | L | 0 | 0 | 1 | 0 | K=C |
| | 0 | 1 | 1 | 0 | 1 | P | L | P | P | P | L | P | L | L | 0 | 0 | 1 | 1 | |
| | 1 | 0 | 0 | 1 | 0 | L | P | P | P | L | P | L | P | L | 0 | 0 | 1 | 0 | |
| | 1 | 0 | 0 | 1 | 1 | L | P | P | P | L | P | L | P | L | 0 | 0 | 1 | 1 | |
A*B = (AB̄ + ĀB)
L = CLOSED SWITCH
P = OPEN SWITCH
FIG. 9
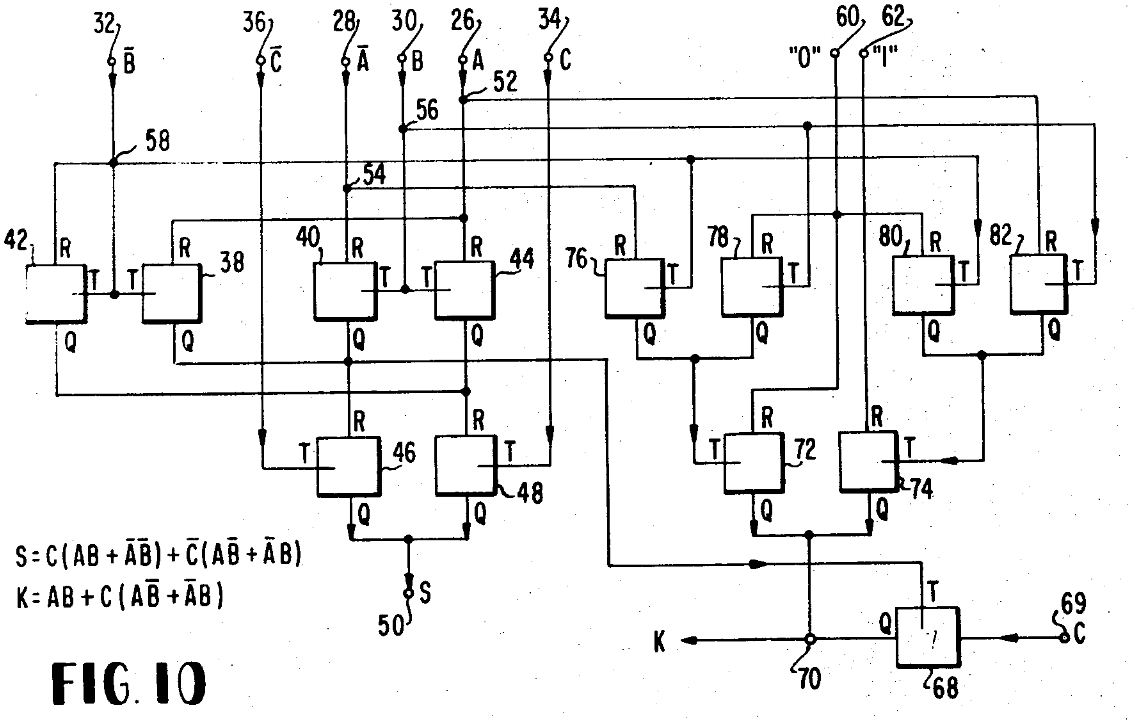
FIG. 10

BINARY FULL ADDER CIRCUIT

BACKGROUND OF THE INVENTION

1. Field of the Invention

This invention relates in general to binary adders and more particularly to binary full adders employing electrical devices for performing logical functions. A binary full adding circuit is one responsive to a plurality of binary input digit signals to provide sum and output carry signals in accordance with the rules of binary addition.

2. Description of the Prior Art

Binary adder circuits are well known to those skilled in the art and are normally made up of AND, OR and NOT logic elements. One example of a full adder circuit comprised of AND and OR circuits is taught in U.S. Pat. No. 3,138,703 issued to G. A. Maley. A full-adder circuit comprised solely of "inverting" or NOT circuits is shown in U.S. Pat. No. 3,022,951 issued to J. L. Anderson. Full-adder circuits utilizing field effect transistors of the insulated gate type are also known to those skilled in the art, an example of which is U.S. Pat. 3,427,445 issued to J. R. Dailey. While the above-referenced prior art teaches combinatorial circuits which operate in the manner intended, the subject invention is directed to an improved high-speed arithmetic unit which is particularly adapted for applications where weight, volume and power requirements must be minimized.

SUMMARY

Briefly, the subject invention is directed to a combinatorial arithmetic circuit including summing and carry generator subcircuits requiring only two levels of logical operation to simultaneously generate both the sum S and output carry K signal when an augend A, addend B and an input carry C signal as well as their complements $\bar{A}$, $\bar{B}$ and $\bar{C}$, respectively, are applied. The first or sum subcircuit comprises a first and second pair of electrical transmission switches, each having first and second current--conducting terminals and a control terminal, and defining a first logic level are coupled to the augend signal A and the addend signal B and their complements $\bar{A}$ and $\bar{B}$ to generate the EXCLUSIVE OR function $A\bar{B}+\bar{A}B$ and the EXCLUSIVE NOR function $AB+\bar{A}\bar{B}$. Signals representative of these two functions are respectively applied to a third pair of electrical transmission switches, defining a second logic level, which have the input carry signal C and its complement $\bar{C}$ applied to their respective current control terminals to gate out a signal indicative of the logic function $\bar{C}(A\bar{B}+\bar{A}B)+C(AB+\bar{A}\bar{B})$ to a sum S output terminal. The second or carry generator subcircuit comprises a pair of electrical transmission switches having their first current--conducting terminals respectively coupled to the augend signal A and $\bar{A}$ and addend signal B and $\bar{B}$ coupled to their control terminals for generating an EXCLUSIVE OR function $A\bar{B}+\bar{A}B$ signal which is applied to the control terminal of a transmission switch having one current-conducting terminal coupled to the input carry signal C and the second current-conducting terminal coupled to an output carry K terminal and generating the function $C(A\bar{B}+\bar{A}B)$ for four of eight possible input combinations of A, B and C. Additionally, a second and third pair of electrical transmission switches comprising a first logic level are coupled to the augend signal A and $\bar{A}$ and addend signal B and $\bar{B}$ as well as steady state signals indicative of a permanent binary "0" and "1" to provide the AND function AB and the NOT OR function $\overline{AB}$ at their respective outputs for the four other possible input combinations of A, B and C. A fourth pair of transmission switches comprising a second logic level have one current conducting terminal commonly coupled to the output carry signal K terminal. The other current conducting terminals of the fourth pair of switches are respectively coupled to the permanent binary "0" and "1" signal while the control terminals thereof are respectively connected to the common connection of the second and third pair of transmission switches. The carry generator subcircuit thereby generates the logic function $AB+C(A\bar{B}+\bar{A}B)$ which is a function of but not controlled by input carry signal C or a function of the augend or addend signals A, $\bar{A}$, B and $\bar{B}$ independent of the input carry signal, for all eight combinations of signals, A, B and C.

BRIEF DESCRIPTION OF THE DRAWINGS

FIG. 1 is a simplified block diagram of a four-bit parallel adder helpful in understanding the teachings of the subject invention;

FIG. 2 is a block diagram broadly illustrative of an electrical transmission switch adapted for use in connection with the subject invention;

FIG. 3 is a "truth table" for the transmission switch shown in FIG. 2;

FIG. 4 is an electrical transmission switch according to FIG. 2 shown comprising a single MOSFET;

FIG. 5 is an electrical transmission switch according to FIG. 2 shown comprising two pairs of complementary MOSFETs;

FIG. 6 is a block diagram illustrative of the preferred embodiment of the sum subcircuit of the subject invention;

FIG. 7 is a "truth table" for the circuit shown in FIG. 6;

FIG. 8 is a block diagram of the preferred embodiment of the carry generator subcircuit of the subject invention;

FIG. 9 is a "truth table" for the circuit shown in FIG. 8; and

FIG. 10 is a block diagram of a full adder circuit for one digit combining the subcircuits shown in FIGS. 6 and 8.

DESCRIPTION OF THE PREFERRED EMBODIMENTS

Referring now to the drawings wherein like numerals refer to like parts, FIG. 1 discloses a four-bit parallel adder circuit for purposes of illustrating a typical use to which the subject invention is applied. Each circuit 12 comprises a full adder which is fed an augend signal A and addend signal B from a register, not shown, as well as an input carry signal C produced by an adder immediately to its right and produces a respective sum S binary output signal as well as output carry signal K which is fed as a C signal to the full adder 12 immediately to its left. This circuit is identified as a parallel adder as opposed to a single "serial" adder which processes the digits sequentially. Typically therefore a full adder circuit receives at least two binary input numbers as well as an input carry signal and produces two outputs which are the binary sum digit signal and the carryout signal.

Directing attention now to FIGS. 2, 4 and 5, there is disclosed three embodiments of electrical transmission switches utilized by the subject invention. FIG. 2 broadly represents in block diagrammatic form any three terminal electrical switch device 14 having first and second current conducting terminals Q and R and a control terminal T. The electrical switch 14 constitutes a device which is operable in accordance with binary logic, i.e., having either one of two operative states such as "on" and "off," "closed" or "open," etc. A "truth table" illustrative of all possible input states and corresponding output states of the transmission switch 14 is illustrated in FIG. 3. The control terminal T is not activated in the logic "0" state and an open circuit is established between the first and second current-conducting terminals R and Q and any signals present at these terminals must be established independently of the transmission switch 14. On the other hand, if the control terminal T is activated indicative of the logic "1" state, a closed circuit condition occurs between the current conducting terminals R and Q through the switch and the signal appearing at each of two terminals R and G must be equal to one another.

FIG. 4 is illustrative of an electrical switch device 14' which comprises a single metal oxide semiconductor field effect transistor 16, hereinafter referred to as a MOSFET. A MOSFET is an insulated gate surface-type field effect transistor having first and second output electrodes defining the ends of a current carrying or conduction path and a single control electrode that conducts substantially no current under steady state input conditions. These electrodes are referred to as the source S, drain D and gate G terminals, respectively. It is to be noted that these terminals correspond to or are common to the R, Q and T terminals of switch 14 shown in FIG. 2. Signals or voltages applied to the gate terminal control the impedance of the current conducting path between the source and drain electrodes. The device is biased or turned "on" when the gate voltage differs from the source voltage by a threshold level in a specified polarity direction. The MOSFET 16 may be either a P-channel device or an N-channel device depending upon the conductivity type of material of the semiconductor selected. A P-channel MOSFET is usually identified by an arrowhead pointing toward the unit and located on the electrode or terminal that usually functions as the source. An N-channel MOSFET is identified by an arrowhead located on the source pointing away from the unit. Additionally, the device is bidirectional and the drain and source electrodes may function reciprocally under differing sets of operating conditions.

Another embodiment of a transmission switch particularly adapted for use in the subject invention is shown in FIG. 5 and which is identified by reference numeral 14''. It comprises a complementary MOSFET configuration including a first pair of MOSFETs 18 and 20 coupled together in parallel by means of their source and drain electrodes which are common to the current--conducting terminals R and Q. The control terminal T is common to the gate electrode of the N-channel MOSFET 18. A second pair of complementary MOSFETs 22 and 24 are coupled together across a source supply potential B+ by means of respective source electrodes while their drain electrodes are directly connected together. This circuit interconnection defines a complementary MOSFET inverter circuit and is used to couple the gate electrode of the P-channel MOSFET 20 to the gate of MOSFET 18. Thus, any signal appearing at the control terminal T is simultaneously applied to the gates of the MOSFETs 18 and 20 in a proper polarity relationship to operate them simultaneously to provide either an open circuit or a closed circuit condition between the current-conducting terminals R and Q. It should be noted however in the event that the complement of the signal applied to terminal T is available for coupling directly to the gate of MOSFET, the MOSFETs 22 and 24 may be deleted.

Directing attention now more particularly to the subject invention, it pertains to an arithmetic data processor unit identified as a full adder and comprises two subcircuits identified as a summing circuit and a carry generator circuit. FIG. 6 illustrates in block diagrammatic form the preferred embodiment of the summing or S circuit of the subject invention. Considering now FIG. 6 in detail, an augend signal A and its complement $\bar{A}$ is applied from a register not shown to the input terminals 26 and 28 respectively. An addend signal B and its complement $\bar{B}$ is also applied from a register, not shown, to the input terminals 30 and 32, respectively. An input carry signal C and its complement $\bar{C}$ is applied from a signal source, for example a preceding adder circuit, not shown, to the input terminals 34 and 36, respectively. The signals A, B and C correspond to the input signals to the adder circuits 12 shown in FIG. 1. In the instant embodiment, however, the complements of these signals are also required. The characteristic logical equation of the summing circuit is expressed as:

$$S=C(AB+\bar{A}\bar{B})+\bar{C}(A\bar{B}+\bar{A}B) \qquad (1)$$

This comprises the EXCLUSIVE OR function $(A\bar{B}+\bar{A}B)$ ANDed with the complement of the input carry signal $\bar{C}$ OR the EXCLUSIVE NOR function ANDed with the incoming carry signal *C*. This is achieved in two switching logic levels in the circuit shown in FIG. 6. More particularly, a first pair of electrical transmission switches 38 and 40 generate the EXCLUSIVE OR function by having the first current-conducting terminal R of switch 38 coupled to the augend signal *A* while the control terminal T is connected to the complement $\bar{B}$ of the addend signal. When the signals *A* and $\bar{B}$ are simultaneously applied to the R and T terminals of the transmission switch 38, the AND function $A\bar{B}$ is provided at the Q terminal while the transmission switch 40 has the complement $\bar{A}$ of the augend signal applied to its R terminal and the addend signal *B* applied to its control terminal T providing the AND function $\bar{A}B$. The EXCLUSIVE NOR function is generated by the transmission switches 42 and 44 which have their R terminals coupled to the complement $\bar{A}$ of the augend signal and the augend signal A respectively. Their control terminals T are coupled to the complement $\bar{B}$ of the addend signal and the addend signal *B*, respectively. These two transmission switches also operate to provide the AND functions *AB* as well as $\bar{A}\bar{B}$.

The second current-conducting terminal Q of the transmission switches 38 and 40 are commonly connected to the first current-conducting terminal R of the transmission switch 46 which comprises the first of a third pair of transmission switches and forming the second level of logic. The T terminal of the transmission switch 46 is coupled to the complement $\bar{C}$ of the input carry signal which operates the transmission switch to provide the AND function thereby generating the first complete term $\bar{C}(A\bar{B}+\bar{A}B)$ of the characteristic equation (1). The second transmission switch 48 of the third pair of transmission switches has its R terminal commonly connected to the Q terminals of the transmission switches 42 and 44 while its control terminal T is connected to the input carry signal C. The input carry signal C is thereby ANDed with logic output of the switches 42 and 44 to provide the second term $C(AB+\bar{A}\bar{B})$ of the characteristic equation (1). Both of the second current-conducting terminals Q of the third pair of transmission switches 46 and 48 are commonly connected to the sum S output terminal 50, thereby providing a digital sum output signal satisfying the characteristic equation (1).

The "truth table" illustrated in FIG. 7 indicates that there are eight possible combinations for the binary input signals *A*, *B*, and *C*, namely, 000, 001, 110, 111, 110, 011, 100, 101. The truth table also indicates that a sum output S having a logical "0" or "1" occurs for the first four conditions 000 ... 111 resulting from the function $C(AB+\bar{A}\bar{B})$ and that the last four conditions 010 ... 101 satisfy the term $\bar{C}(A\bar{B}+\bar{A}B)$. Since the first and second term are part of logic OR, any one of the eight possible conditions will satisfy the characteristic equation and provide the desired binary output at the S output terminal 50.

Considering now the carry generator subcircuit of the subject invention, it is illustrated as the K circuit shown in FIG. 8 and again comprises a logic circuit having two levels of logic operation to generate an output carry signal K which is translated to, for example, an adjoining adder circuit to its left according to the following characteristic equation:

$$K=AB+C(A\bar{B}+\bar{A}B). \qquad (2)$$

A fast carry propagation is realized by the circuit shown in FIG. 8 on the basis that the incoming carry signal *C* applied from a source, for example the preceding adder circuit immediately to its right, not shown, is not used as a control signal, but is a signal translated in accordance with a control signal generated from a logic combination of the augend signal *A* and the addend signal *B* and their complements $\bar{A}$ and $\bar{B}$. Moreover, fast carry propagation is further enhanced by generating the output carry signal *K* for four of eight possible input combinations of the summing circuit shown in FIG. 6 independently of the incoming carry signal *C*.

FIG. 8 discloses seven input terminals wherein the augend signal *A* is applied to terminal 52 and its complement $\bar{A}$ is applied to terminal 54. The addend signal *B* and its complement $\bar{B}$ are applied to terminals 56 and 58. The two terminals 60 and 62 have a constant signal voltage corresponding to a logic "0" and a logic "1" respectively applied thereto. The logical "0" is defined in the subject invention as zero or ground potential, whereas a logic "1" is a positive potential of a predetermined magnitude greater than zero. However any assignment of logic levels may be assigned as is consistent with MOSFET technology. The *K* circuit additionally includes a pair of electrical transmission switches 64 and 66 which have their first current-conducting terminals R coupled to terminals 52 and 54, respectively, having the signals *A* and $\bar{A}$ applied thereto. The control terminal T of the switches 64 and 66 are respectively connected to terminals 58 and 56. The second current-conducting terminal Q of the switches 64 and 66 are commonly connected to the control terminal of electrical transmission switch 68 which has its first current-conducting terminal R connected to the seventh input terminal 69 to which is applied the input carry signal $C$. The second current-conducting terminal Q of switch 68 is connected to an output carry signal terminal 70. The transmission switches 64, 66 and 68 generate the logic function $C(A\bar{B}+\bar{A}B)$ which is the second term of the characteristic equation (2). It should be noted that this term is generated for four of the eight possible combinations of the augend signal $A$, the addend signal $B$ and the incoming carry signal $C$ for the summing circuit shown in FIG. 6. This is illustrated in the lower half of the truth table shown in FIG. 9. It should be particularly noted in this instance that the generated output carry signal constitutes a mere translation of the input carry signal $C$ through the transmission switch 68 but with the control of the transmission switch 68 being logical combinations of the signal $A$, $\bar{A}$ and $B$, $\bar{B}$ only.

The first term of the characteristic equation (2) wherein $K=AB$ is satisfied for the other four logical combinations as shown in the truth table in FIG. 9 is accomplished by electrical transmission switches 72, 74, 76, 78, 80 and 82. Switches 72 and 74 have their first current-conducting terminal R respectively connected to terminals 60 and 62, which have the permanent or steady state logic "0" and logic "1" signal voltages applied thereto. The second current-conducting terminals Q of the transmission switches 72 and 74 are commonly connected to the output carry signal K terminal 70. The control terminal T of transmission switch 72 is controlled by a signal from the electrical transmission switches 76 and 78. Similarly, the control terminal T of transmission switch 74 is controlled by a signal from the electrical transmission switches 80 and 82. The transmission switches 76 and 80 are controlled by means of the complement $\bar{B}$ of the addend signal which is applied to the control terminal T thereof. On the other hand, the switches 78 and 82 are controlled by the addend signal $B$ which is applied to their respective control terminals T. The first current conducting terminal R of the transmission switch 76 is connected to terminal 54 to which is applied to the complement $\bar{A}$ of the augend signal while the first current conducting terminal R of the transmission switch 82 is connected to terminal 52 which has the augend signal A applied thereto. Finally, the first current conducting terminals R of the transmission switches 78 and 80 are commonly connected to the logic "0" signal applied to terminal 60.

Consider the operation of the K subcircuit and first the function $\bar{A}\bar{B}$ of the truth table (FIG. 9) for the condition where $\bar{A}\bar{B}$="1," that is where both the augend signal $A$="0" and the addend signal $B$="0" as indicated in the first two lines of the truth table of FIG. 9. The output carry signal $K$ generated is independent of the incoming carry signal $C$ and is established at a logical level of "0" due to the fact that switch 76 is closed because terminal 58 is a logical "1."

Junction 77 is a logical "1" because terminal 54 applied through switch 76 is also a logical "1." Switch 72 is closed because junction 77 is a logical "1." Terminal 70 is a logical "0" because terminal 60 is applied through the closed switch 72. Switch 78 is open because terminal 56 is a logical "0" and this prevents the logical "0" present at terminal 60 from passing through switch 78 to junction 77. This is important because switch 76 is acting to establish a logical "1" at junction 77. Switch 80 is closed because terminal 58 is at a logical "1," and this establishes a logical "0" at junction 83. Switch 74 is open because of the logical "0" at junction 83 which prevents the logical "1" present at terminal 62 from reaching terminal 70 through switch 74. Switch 82 is open because terminal 56 is a logical " 0" which prevents the signal at terminal 52 from reaching junction 83 through switch 82. Since terminal 52 is a logical "0," this is immaterial in this present case. Switch 64 is closed because terminal 58 is at a logical "1" and this establishes a logical "0" at junction 67 as a result of terminal 52 being applied thereto through switch 64. Switch 66 is open because terminal 56 is at a logical "0." This prevents the logical "1" present at terminal 54 from reaching junction 67 through switch 66. Switch 68 is open because junction 67 is a logical "0" and this prevents the translation of the input carry signal $C$ present at terminal 69 as an output carry signal $K$ to terminal 70. In this manner a stable condition has been established at every point of the circuit.

Under all situations when the condition $\bar{A}\bar{B}$="1" is not satisfied (i.e., whenever $\bar{A}\bar{B}$="0") junction 77 will be kept at a logical "0" level through either switch 76 or switch 78 and the output carry signal $K$ will not be determined by the logical "0" at terminal 60 because switch 72 will always be open under these conditions. The condition $\bar{A}\bar{B}$="0" can be achieved in one of three ways:

a. $A$="0," $B$="1" - Switch 76 is open because terminal 58 will then be a logical "0." Switch 78 is closed because terminal 56 is now a logical "1." Junction 77 is a logical "0" because terminal 60 is applied through switch 78. Switch 72 is open because junction 77 is a logical "0" which prevents the logical "0" present at terminal 60 from reaching junction 70 through switch 72.

b. $A$="1," $B$="0" - Switch 76 is closed because terminal 58 is now a logical "1." Junction 77 is a logical "0" because terminal 54 is applied through switch 76. Switch 78 is open because terminal 56 is a logical "0." Switch 72 is open because junction 77 is a logical "0" and this prevents the logical "0" present at terminal 60 from reaching terminal 70 through switch 72.

c. $A$="1," $B$="1" - Switch 76 is open because now terminal 58 is a logical "0." Switch 78 is closed because terminal 56 is a logical "1." Junction 77 is a logical "0" because terminal 60 is applied through switch 78. Switch 72 is open because junction 77 is a logical "0" and this prevents the logical "0" present at terminal 60 from reaching terminal 70 through switch 72. Condition (c) exists under the condition $AB$="1" and is operative in helping to determine rows three and four in the truth table depicted in FIG. 9. Condition (a) exists under the condition $A*B$="1" and is operative in helping to determine rows five and six of the truth table. Condition (b) exists under the condition $A*B$="1" and is operative in helping to determine rows seven and eight of the truth table.

Considering now the function $AB$ for the condition $AB$=" 1," that is where both the augend signal $A$=1, and the addend signal $B$=1 as indicated in the third and fourth rows of the truth table of FIG. 9, the output carry signal K is independent of the incoming carry signal C and is established at a logical level of "1." This is due to the fact that switch 82 is closed because terminal 56 is at a logical "1." Junction 83 is at a logical "1" because terminal 52 is applied thereto through switch 82. Switch 74 is closed because junction 83 is a logical "1" thereby applying a "1" to terminal 70. Switch 80 is open because terminal 58 is a logical "0" which prevents the logical "0" present at terminal 60 from passing through switch 80 to junction 83. This is important because switch 82 is acting to establish a logical " 1" at junction 83. Switch 78 is closed because terminal 56 is now a logical "1," and this establishes a logical "0" at junction 77 because terminal 60 is applied through switch 78. Switch 72 is open because the logical "0" at junction 77 prevents the logical "0" present at terminal 60 from reaching terminal 70 through switch 72. Switch 76 is open because terminal 58 is now at a logical "0." This prevents the signal at terminal 54 from reaching junction 77 through switch 76. Since terminal 54 is a logical "0," this is immaterial in this present case. Switch 66 is closed because terminal 56 is a logical "1" and this establishes a logical "0" at junction 67 as a result of terminal 54 being applied through switch 66. Switch 64 is open because terminal 58 is now a logical "0." This prevents the logical "1" present at terminal 52 from reaching junction 67 through switch 64. Switch 68 is open because junction 67 is at a logical "0" level which in turn prevents the coupling of the input carry signal $C$ present at terminal 69 to be translated as an output carry signal $K$ to terminal 70. In this manner a stable condition has been established at every point of the subcircuit.

Under all situations where the condition $AB=1$ is not satisfied (i.e., whenever $AB=0$) junction 83 will be kept at a logical "0" level through either switch 82 or switch 80 and the output carry signal $K$ will not be determined by the logical "1" at terminal 62 because switch 74 will always be open under these conditions. The condition $AB=$"0" can be achieved in one of three ways:

d. $A=$"0," $B=$"0" - Switch 80 is closed because terminal 58 is now a logical "1." Junction 83 is a logical "0" because terminal 60 is applied thereto through switch 80. Switch 82 is open because terminal 56 is now a logical "0." Switch 74 is open because junction 83 is a logical "0" and this prevents the logical "1" present at terminal 62 from reaching terminal 70 through switch 74.

e. $A=$"0," $B=$"1" - Switch 80 is open because terminal 58 is at a logical "0" level. Switch 82 is closed because terminal 56 on the other hand is a logical "1." Junction 83 is at a logical "0" because terminal 52 is applied thereto through switch 82. Switch 74 is open because junction 83 is a logical "0" which prevents the logical "1" present at terminal 62 from reaching terminal 70 through switch 74.

f. $A=$"1," $B=$"0" - Switch 80 is closed because terminal 58 is a logical "1." Switch 82 is open because terminal 56 is a logical "0." Junction 83 is a logical "0" because terminal 60 is applied through switch 80. Switch 74 is open because junction 83 is a logical "0" which in turn prevents the logical "1" at terminal 62 from reaching terminal 70 through switch 74.

Condition (d) exists under the condition $\overline{A}\overline{B}=$"1" and is operative in helping to determine rows one and two of the truth table depicted in FIG. 9. Condition (e) exists under the condition $A*B=$"1" and is operative in helping to determine rows five and six of the truth table. Condition (f) exists under the condition $A*B=$"1" and is operative in helping to determine rows seven and eight of the truth table.

Lastly, consider the function $A\overline{B}+\overline{A}B$ referred to for purposes of simplification as $A*B$ for the condition where $A*B=$"1," that is where either the augend signal $A=$"1" or the addend signal $B=1$ but both signals are never the same simultaneously. As depicted in the truth table of FIG. 9, the output carry signal $K$ is always equal to the corresponding input carry signal $C$. This is accomplished by coupling the input carry signal present at terminal 69 directly to terminal 70 through switch 68. The condition $A*B=$"1" can be achieved in one of two ways:

g. $A=$"1," $B=$"0" The output carry signal $K$ is made equal to the input carry signal $C$ as a consequence of switch 64 being closed because terminal 58 is a logical "1"; junction 67 is a logical "1" because terminal 52 is applied through switch 64; switch 68 is closed because junction 67 is at a logical "1"; consequently terminal 70 is directly coupled to terminal 69 through switch 68. Switch 66 is open because terminal 56 is a logical "0" and this prevents the signal at terminal 54 from reaching junction 67 through switch 66. This is important because terminal 54 is a logical "O" and switch 64 is acting to establish a logical "1" at junction 67. Switch 76 is closed because terminal 58 is a logical "1." This establishes a logical "0" at junction 77 because of terminal 54 being applied thereto through switch 76. Switch 72 is open because junction 77 is a logical "0," and this prevents the logical "0" present at terminal 60 from reaching output terminal 70 through switch 72. Switch 78 is open because terminal 56 is a logical "0" and as such prevents the signal at terminal 60 from reaching junction 77 through switch 78. Since terminal 60 is a logical "0," this is immaterial in this present case. Switch 80 is closed because terminal 58 is a logical "1," and this establishes a logical "0" at junction 83 because of terminal 60 connected thereto through switch 80. Switch 74 is open because junction 83 is a logical "0," and this prevents the logical "1" present at terminal 62 from reaching output terminal 70 through switch 74. Switch 82 is open because terminal 56 is a logical "0" which prevents the signal present at terminal 52 from reaching junction 83 through switch 82. This is important because switch 80 acts to establish a logical "0" junction 83. In this manner a stable condition has been established at every point of the subcircuit shown in FIG. 8 and this case is depicted by the seventh and eighth rows of the truth table shown in FIG. 9.

h. $A=$0," $B=$"1. The output carry signal $K$ is made equal to the input carry signal $C$ as a consequence of switch 66 being closed because terminal 56 is a logical "1"; junction 67 is a logical "1," etc. junction 67 is a logical "1" because terminal 54 is applied thereto through switch 66; switch 68 is closed because junction 67 is at a logical "1" level; consequently output terminal 70 is directly coupled to terminal 69 through switch 68. Switch 64 is open because terminal 58 is at a logical "0" level and this prevents the signal at terminal 52 from reaching junction 67 through switch 64. This is important because terminal 52 is a logical "0" and switch 66 acts to establish a logical "1" at junction 67. Switch 76 is open because terminal 58 is a logical "0." This prevents the signal at terminal 54 from reaching junction 77 through switch 76. Switch 78 is closed because terminal 56 is a logical "1" which establishes a logical "0" level at junction 77 because terminal 60 is coupled thereto to means of switch 78. Switch 72 is open because junction 77 is at a logical "0" level and this prevents the logical "0" present at terminal 60 from reaching output terminal 70 through switch 72. Switch 80 is open because terminal 58 is a logical "0," which in turn prevents the logical "0" present at terminal 60 from reaching junction 83. Switch 82 is closed because terminal 56 is now a logical "1." This establishes a logical "0" at junction 83 because terminal 52 is applied thereto through switch 82. Switch 74 is open because junction 83 is a logical "0," and in turn prevents the logical "1" present at terminal 62 from reaching output terminal 70 through switch 74. In this manner a stable condition has been established at every point of the subcircuit and this case is depicted by the fifth and sixth rows of the truth table shown in FIG. 9.

Under all situations when the condition $A*B=$"1" is not satisfied (i.e., whenever $A*B=$"0") junction 67 will be kept at a logical "0" level through either switch 64 or switch 66 and the output carry signal $K$ will not be determined by the incoming carry signal $C$ present at terminal 69 because switch 68 will always be open under these conditions. The condition $A*B=$"0" can be achieved in one of two ways:

i. $A=$"0," $B=$"0" - Switch 66 is open because terminal 56 is at a logical "0" level. Switch 64 is closed because terminal 58 however is a logical "1." Junction 67 is a logical "0" because terminal 52 is applied thereto through switch 64. Switch 68 is open because junction 67 is a logical "0" which prevents the coupling of terminal 69 to output terminal 70 through switch 68.

j. $A=$"1," $B=$"1" - Switch 64 is open because terminal 58 is at a logical "0" level. Switch 66 is closed because terminal 56 is a logical "1." Junction 67 is a logical "0" because terminal 54 is applied thereto through switch 66. Switch 68 is open because junction 67 is at a logical "0" level and this prevents the coupling of input terminal 69 to output terminal 70 through switch 68.

Condition (i) exists under the condition $\overline{A}\overline{B}=1$ and is operative in helping to l determine rows one and two of the truth table shown in FIG. 9. Condition (j) exists under the condition $AB=1$ and is operative in helping to determine rows three and four of the truth table.

The operation of the $K$ circuit shown in FIG. 8 has been considered separately merely for purposes of explanation. It should be observed, however, that the $S$ circuit shown in FIG. 6 and the $K$ circuit shown in FIG. 8 when configuring a full adder circuit have their respective inputs, e.g., $A$, $\overline{A}$, $B$, $\overline{B}$, etc. applied from common sources and will generate the sum output signal S and the output carry signal $K$ simultaneously. This accounts for the identical logical combinations shown in the truth tables of FIGS. 7 and 9. Furthermore, no two of these conditions can exist simultaneously. Thus, if the combinations $\overline{A}$ $\overline{B}$ corresponding to the first two rows of the truth table shown in FIG. 9 is satisfied, the *K* signal terminal 70 is gated to the logical "0" level. Also the sum output S will likewise be a logic "0" and then a logic "1." If on the other hand for the two conditions of *AB*, corresponding to a third and fourth combinations of the truth table of FIG. 9 is satisfied, terminal 70 is gated to the logical "1" level. For these four conditions, the output carry signal *K* is independent of the incoming carry signal *C* generated in the previous bit, not shown, and does not depend on any propagation from one bit to the next. As stated before, for the other four possible combinations of inputs, the incoming carry signal is gated only through one transmission switch 68. This permits achievement of short propagation time and therefore enables a high speed of operation.

Directing attention now to FIG. 10, there is disclosed in block diagrammatic form a full adder circuit which incorporates the *S* circuit shown in FIG. 6 and the K circuit in FIG. 8 and is in every respect identical thereto with the exception that the pair of transmission switches 64 and 66 shown in FIG. 8 are deleted and the control terminal T of the transmission switch 68 is connected to the common Q terminals of transmission switches 38 and 40, inasmuch as they already generate the necessary EXCLUSIVE OR function ($A\overline{B}+\overline{A}B$) necessary to realize the second term of the characteristic equation (2). The operation of the full adder circuit shown in FIG. 10 is identical to the operation explained with respect to the embodiment of the circuit shown in FIG. 6 and the embodiment of the *K* circuit shown in FIG. 8 and illustrates the fact that the sum signal S and the output carry signal *K* are generated simultaneously as opposed to prior art apparatus where the carry out signal is normally generated prior to the sum output signal being generated.

What has been shown and described therefore is an improved binary arithmetic circuit which is particularly adapted to utilize the transmission switches comprised of one or more MOSFETs which can be fabricated as an integrated circuit on a common semiconductive substrate such as silicon. Moreover, the transmission switch logic is organized on a two level logic operation for the entire full adder function, thereby enabling a high speed of operation due to the short propagation time achieved thereby.

We claim as our invention:

1. A combinatorial circuit including a plurality of electrical transmission switches having a first and a second current-conducting terminal and a control terminal for effecting either a closed or an open circuit between said first and second current conducting terminals, comprising in combination:

a first set of three input terminals for receiving respectively inputs representative of an augend signal *A*, an addend signal *B* and an input carry signal *C;* a second set of three input terminals for receiving respectively inputs representative of the complement signals $\overline{A}$, $\overline{B}$, and $\overline{C}$ of said augend, said addend and said input carry signals;

a first electrical transmission switch including circuit means connecting the first current-conducting terminal thereof to the augend signal *A* input terminal and the current control terminal to the complement $\overline{B}$ signal input terminal, being operable to provide the logic function $A\overline{B}$ at the second current-conducting terminal;

a second electrical transmission switch including circuit means connecting the first current conducting terminal thereof to the complement $\overline{A}$ signal input terminal and the current control terminal to the addend signal *B* input terminal and providing the logic function $\overline{A}B$ at the second current-conducting terminal;

circuit means connecting the second current conducting terminal of said first and second switch at a first circuit junction and providing a signal having the logical function $A\overline{B}+\overline{A}B$ thereat;

a third electrical transmission switch including circuit means coupling said first current-conducting terminal thereof to said first circuit junction and the current control terminal to the complement $\overline{C}$ signal input terminal and being operable to provide an output signal of the logic function $\overline{C}(A\overline{B}+\overline{A}B)$ at the second current-conducting terminal thereof;

a sum signal *S* output terminal including circuit means coupling said output terminal to said second current terminal of said third transmission switch;

a fourth electrical transmission switch including circuit means connecting the first current conducting terminal thereof to the augend signal *A* input terminal and the current control terminal to the addend signal *B* input terminal, being operable to provide the logic function *AB* at the second current-conducting terminal a fifth electrical transmission switch including circuit means connecting the first current-conducting terminal thereof to the complement $\overline{A}$ signal input terminal and the control terminal to the complement $\overline{B}$ signal input terminal being operable to provide the logic function $\overline{AB}$ at the second current-conducting terminal;

circuit means connecting the second current-conducting terminal of said fourth and fifth transmission switch at a second circuit junction and providing a signal of the logic function $AB+\overline{AB}$;

a sixth electrical transmission switch including circuit means connecting the first current-conducting terminal thereof to said second circuit junction and the control terminal to the input carry signal *C* input signal, being operable to provide an output signal at the second current-conducting terminal of the logic function $C(AB+\overline{AB})$; and circuit means connecting said second current-conducting terminals of said sixth transmission switch to said sum signal *S* output terminal.

2. The invention as defined by claim 1 wherein said plurality of electrical transmission switches are comprised of semiconductor switch means.

3. The invention as defined by claim 1 wherein said plurality of electrical transmission switch means are comprised of field effect transistors having source, drain and gate electrodes and wherein said first and second current conducting terminals are respectively common to either of said source and drain electrodes and said control terminal is common to said gate electrode.

4. The invention as defined by claim 3 wherein said field effect transistors are comprised of metal oxide semiconductor field effect transistors of like semiconductivity.

5. The invention as defined by claim 1 wherein said plurality of transmission switches are each comprised of at least one pair of complementary MOSFETs having source, drain and gate electrodes including circuit means coupling respective drain and source electrodes in parallel and wherein said first and second current conducting terminals respectively comprise said source and drain electrodes and said gate electrode of one of said complementary pair comprises said control terminal.

6. The invention as defined by claim 5 and additionally including signal inverter means coupled between the gate electrodes of said at least one pair of complementary MOSFETs.

7. The invention as defined by claim 6 wherein said signal inverter means comprises a second pair of complementary MOSFETs, each having source, drain and gate electrodes, and including circuit means commonly coupling the gate electrodes thereof to said gate electrode of said one MOSFET of said at least one pair, circuit means commonly connecting the drain electrodes to the gate electrode of the other MOSFET of said at least one pair, and circuit means coupling said source electrodes of said second complementary pair of MOSFETs across a bias potential.

8. The invention as defined by claim 1 and additionally including:

an output carry signal *K* output terminal;

a seventh electrical transmission switch including circuit means connecting the first current-conducting terminal thereof to the input carry signal *C* input terminal, circuit means connecting the control terminal thereof to said first circuit junction and circuit means connecting the second current conducting terminal to said output carry signal $K$ output terminal;

a third set of two input terminals for receiving respectively inputs representative of a first and a second steady state logic level;

an eighth electrical transmission switch including circuit means connecting the first current--conducting terminal thereof to the complement $\bar{A}$ of the augend input signal input terminal and circuit means connecting the control terminal to the complement $\bar{B}$ of the addend input signal input terminal and being operable to provide the logic function $\bar{A}\bar{B}$ at the second current-conducting terminal;

a ninth electrical transmission switch including circuit means connecting the first current-conducting terminal thereof to one input terminal of said third set of input terminals and circuit means connecting the control terminal to the addend signal $B$ input terminal;

a 10 electrical transmission switch including circuit means connecting the first current-conducting terminal thereof to said one terminal of said third set of input terminals and circuit means connecting the control terminal commonly to the second current-conducting terminal of said eighth and ninth electrical transmission switches, said eighth, ninth and 10 electrical transmission switches being operable to gate said first steady state logic level to said second output terminal for two of eight possible combinations of augend, addend and input carry signals;

an 11 electrical transmission switch including circuit means connecting the first current-conducting input terminal thereof to the augend signal $A$ input terminal and circuit means connecting the control terminal to the addend signal $B$ input terminal and being operable to provide the logic function $AB$ at the second current--conducting terminal;

a 12 electrical transmission switch including circuit means connecting the first current-conducting terminal thereof to said one input terminal of said third set of input terminals and circuit means connecting the control terminal to the complement $\bar{B}$ of the addend input signal input terminal;

a 13 electrical transmission switch including circuit means connecting the first current-conducting terminal thereof to the second input terminal of said third set of input terminals, and circuit means commonly connecting the current control terminal thereof to he second current-conducting terminal of said 11 and 12 electrical transmission switches, said 11, 12 and 13 electrical transmission switches being operable to gate said steady state signal of said second steady state logic level to said output carry signal $K$ output terminal for two other combinations of augend, addend and input carry signals; and circuit means commonly connecting the second current-conducting terminal of said 10 and 13 electrical transmission switches to said output carry signal $K$ output terminal, and providing an output having the characteristic logic equation $K=AB+C(A\bar{B}+\bar{A}B)$ for the eight possible combinations of augend, addend and input carry signals.

9. The invention as defined by claim 8 wherein said plurality of electrical transmission switches are comprised of semiconductor switches.

10. The invention as defined by claim 8 wherein said plurality of electrical transmission switches are comprised of field effect transistors having source, drain and gate electrodes and wherein said first and second current-conducting terminals are respectively common to either of said source and drain electrodes and said control terminal is common to said gate electrode.

11. The invention as defined by claim 10 wherein said field effect transistors are comprised of insulated gate field effect transistors.

12. The invention as defined by claim 8 wherein all said electrical transmission switches are comprised of at least one pair of complementary MOSFETs each having drain, source and gate electrodes and including circuit means coupling respective drain and source electrodes in parallel and wherein said drains define said first current-conducting terminal, the sources define said second current-conducting terminal and the gate electrode of at least one of said one pair of complementary MOSFETs defines said control terminal.

13. The invention as defined by claim 12 and additionally including a signal inverter circuit, comprising a second pair of complementary MOSFETs, coupled between the gate electrodes of said at least one pair of complementary MOSFETs.

14. An arithmetic circuit for producing a binary output carry signal $K$ comprising in combination:

a first set of five input terminals (52), (54), (56), (58) and (69) having input signals respectively applied thereto representative of a binary augend signal $A$, its complement $\bar{A}$, a binary addend signal $B$, its complement $\bar{B}$ and a binary input carry signal $C$;

a second set of two input terminals (60) and (62) having steady state signals applied thereto representative of a "0" binary logic state and a "1" binary logic state respectively;

a plurality of electrical transmission switches having first and second current-conducting terminals and a control terminal for effecting an open and closed current-conducting path between said first and second current conducting terminals upon the application of a control signal thereto, said plurality comprising:

a first and second electrical transmission switch (64) and (66) each including circuit means connecting respective first current-conducting terminals thereof to the augend signal $A$ input terminal (52) and the complement $\bar{A}$ input terminal (54), circuit means connecting respective control terminals to the complement $\bar{B}$ of the addend signal input terminal (58) and the addend signal $B$ input terminal (56) and circuit means commonly coupling the second current-conducting terminal of said first and second transmission switch at a first junction (67) and providing a binary signal thereat of the logical function $(A\bar{B}+\bar{A}B)$;

an output terminal (70) adapted to provide the carry output signal $K$ thereat;

a third electrical transmission switch (68) including circuit means connecting the first current-conducting terminal thereof to the input carry signal $C$ input terminal (69), circuit means connecting the control terminal to said first junction (67) and circuit means connecting the second current-conducting terminal to said output terminal (70) and providing the logical function $C(A\bar{B}+\bar{A}B)$ for four of eight possible combinations of input signals;

a fourth electrical transmission switch (76) including circuit means connecting the first current-conducting terminal thereof to the complement $\bar{A}$ of the augend signal input terminal (54) and circuit means connecting the control terminal to the complement $\bar{B}$ of the signal input terminal (58);

a fifth electrical transmission switch (78) including circuit means connecting the first current-conducting terminal thereof to one input terminal (60) of said second set of input terminals, and circuit means connecting the control input terminal to the addend signal $B$ input terminal (56);

a sixth electrical transmission switch (72) including circuit means connecting the first current-conducting terminal thereof to said one input terminal (60) of said second set of input terminals and circuit means connecting the control terminal commonly to the second current-conducting terminals of said fourth and fifth electrical transmission switches (76) and (78) at a second junction (77), and circuit means connecting the second current-conducting terminal of said sixth transmission switch (72) to said output terminal (70) and gating said steady state "0" logic state to said output terminal (70) for two other of said eight possible combinations of input signals for providing the logic function $AB$;

a seventh electrical transmission switch (82) including circuit means connecting the first current-conducting terminal thereof to the augend signal $A$ input terminal (52) and circuit means connecting the control input terminal to the addend signal $B$ input terminal (56);

an eighth electrical transmission switch (80) including circuit means connecting the first current-conducting terminal to said first input terminal (60) of said second set of input terminals and circuit means connecting the control terminal to the complement signal $\overline{B}$ input terminal (58);

and a ninth electrical transmission switch (74) including circuit means connecting the first current conducting terminal thereof to the second input terminal (62) of said second set of input terminals, circuit means commonly connecting the control terminal to the second current-conducting terminals of said seventh and eighth electrical transmission switches (80) and (82) at a third junction (83), and circuit means connecting the second current-conducting terminal of said ninth electrical transmission switch to said output terminal (70) and providing the logic function $AB$ for the remaining two possible combinations of input signals, whereby said output terminal (70) provides a carry out signal $K$ according to the logic equation $K=AB+C(A\overline{B}+\overline{A}B)$ for said eight possible combinations of input signals.

15. The invention as defined by claim 14 wherein all said electrical transmission switches are comprised of semiconductor switches.

16. The invention as defined by claim 14 wherein all said electrical transmission switches are comprised of field effect transistors having source, drain and gate electrodes and wherein said drain and source electrodes comprise respectively either said first or second current-conducting terminals and said gate electrode comprises the control terminal.

17. The invention as defined by claim 16 wherein said field effect transistors comprise MOSFETs of the same semiconductivity type.

18. The invention as defined by claim 14 wherein said electrical transmission switches are comprised of at least one pair of complementary MOSFETs, each having source, drain and gate electrodes, including circuit means coupling respective drain and source electrodes in parallel and thereby defining said first and second current-conducting terminals respectively, wherein the gate electrode of one of said pair of complementary MOSFETs defines said control terminal, and electrical signal inverter means coupled between the above-recited gate electrode and the gate electrode of the other MOSFET of said complementary pair of MOSFETs.

19. The invention as defined by claim 18 wherein said inverter circuit comprises a second pair of complementary MOSFETs each having source, drain and gate electrodes, and including circuit means commonly connecting the gate electrodes thereof to the gate electrode of one MOSFET of said at least one pair, the drain electrodes commonly to the gate electrode of the other MOSFET of said at least one pair, and the source electrodes thereof across a bias potential.